United States Patent [19]

Oka et al.

[11] Patent Number: 4,755,681
[45] Date of Patent: Jul. 5, 1988

[54] RADIATION IMAGE DETECTING APPARATUS WITH IC MODULES STACKED STEPWISE

[75] Inventors: Syotaro Oka, Muko; Motosada Kiri, Kyoto; Takeshi Nakanishi, Kyoto; Kenji Shibata, Kyoto, all of Japan

[73] Assignee: Shimadzu Corporation, Kyoto, Japan

[21] Appl. No.: 913,416

[22] Filed: Sep. 29, 1986

[51] Int. Cl.$^4$ .................. H01L 25/08; G01T 1/208
[52] U.S. Cl. ........................ 250/370.01; 250/332; 250/338.1; 250/349; 250/366; 250/367
[58] Field of Search .......... 378/62; 250/370 I, 370 H, 250/370 G X, 370 G, 338 SE, 332, 330, 363 SA, 368, 367, 366, 349

[56] References Cited

U.S. PATENT DOCUMENTS

| 4,147,935 | 4/1979 | Warrikhoff | 378/99 |
| 4,618,763 | 10/1986 | Schmitz | 250/211 R |
| 4,659,931 | 4/1987 | Schmitz et al. | 250/338 SE |
| 4,700,076 | 10/1987 | Dorman et al. | 250/370 G |

Primary Examiner—Janice A. Howell
Assistant Examiner—Constantine Hannaher
Attorney, Agent, or Firm—Koda and Androlia

[57] ABSTRACT

A radiation image detecting apparatus having its radiation image receiving plane divided into picture elements made up of a plurality of two-dimensionally arrayed unit radiation detectors and having its picture element image signal processing electronic circuits thereon in a plurality of IC packages.

13 Claims, 3 Drawing Sheets

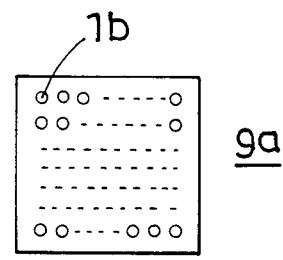
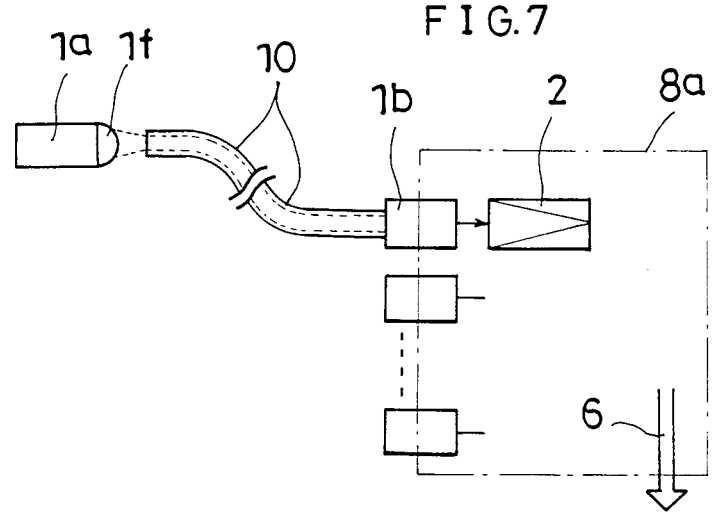

RADIATION IMAGE DETECTING APPARATUS WITH IC MODULES STACKED STEPWISE

BACKGROUND OF THE INVENTION

The present invention relates to a radiation image detecting apparatus having its radiation image receiving plane composed of a two-dimensional array of unit radiation sensors and having its image signal processing electronic circuits integrated in groups.

As a typical example of radiation image detecting apparatus, an X-ray camera using an emulsion film is well known. One of the disadvantages of such an apparatus using a film is that it takes a long time to finally provide a picture (photograph) of an image projected on the emulsion film, owing to the film development process. Another disadvantage is that limited linearity of darkness level of the emulsion makes it impossible to provide a high quality picture precisely reflecting the radiation intensity variations on an image projected on the emulsion film. Moreover, in case of an X-ray camera for use in diagnosis, a dose of X-rays to be irradiated to a human body is relatively large.

To overcome the above mentioned disadvantages, in case of detecting an X-ray image, there has been developed an apparatus in which emulsion film is replaced with a combined system of an X-ray image intensifier and a TV camera. According to this apparatus, an X-ray image projected on the X-ray image intensifier is converted to an electrical picture signal by the TV camera and then displayed on a CRT screen. However, this type of X-ray image detecting system also has a disadvantage: the dynamic range of the TV camera is smaller than that of a general radiation image to be detected, resulting in the quality deterioration of the picture obtained.

Another possible alternative method of radiation image detection is by means of a G-M counter. According to this method a radiation image is converted to an electrical picture signal by a G-M counter scanning mechanically on the plane where a radiation image is formed. The method by a G-M counter is suitable for analyzing local details of the image precisely, but inconvenient for picturing the entire aspect of the image, and therefore it often applies to an X-ray analysis of crystal rather than an X-ray image detection.

In addition, the apparatus using an emulsion film and that using a G-M counter have a common disadvantage that they are not suitable for the detection of an image whose profile or intensity distribution varies rapidly, because of an emulsion film exposure time or a G-M counter scanning period.

Such a disadvantage can be overcome by constituting the radiation image receiving plane with a numerous number of picture elements made of unit radiation sensors. All the picture element signals coincidentally outputted from the picture elements are once stored in a memory and then displayed on a CRT screen to give the entire picture of an image projected on the radiation image receiving plane at an instance. Though the method based on this principle has already been applied to a γ-ray image detecting apparatus, many problems are still left unsolved in realizing a highly sensitive and resolving apparatus. In case of an X-ray image detecting apparatus, for example, for use in diagnosis, the image detection is necessarily completed within several milliseconds with a sensitivity capable of detecting one X-ray photon, covering an image receiving area of 30 cm×30 cm constituted with about 1000×1000 unit picture elements. Such requirements can be fulfilled, in principle, by constituting the radiation (X-ray) image receiving plane with an X-ray scintillator board accompanied by an array of light signal processing IC packages disposed with their light signal input windows directed and closely contacted to the rear surface of the scintillator board, the windows each having an array of photoelectric sensors each of which constitutes the signal input stage of each of the circuits integrated in the respective IC packages. An X-ray image projected on the scintillator board and converted to a visible-light image by the same is detected through the arrayed photoelectric sensors with the image divided into picture elements. However, the signal input window of the light signal processing IC now available has an area of only about one square centimeter wherein about 32×32 photoelectric sensors are included at most. Therefore, not only the scintillator board having an area of 30 cm×30 cm must of course be accompanied by a large number of ICs, but also the clearances formed around the signal input windows of the ICs form a large-areal check-patterned dead space on the area of the image to be detected and make the apparatus impractical.

OBJECTS AND SUMMARY OF THE INVENTION

The present invention aims at overcoming the difficulties mentioned above in conjunction with providing a radiation image detecting apparatus having its radiation image receiving plane composed of picture elements, and makes it an object to provide a radiation image detecting apparatus whose radiation image receiving plane consists of an array of unit picture elements made up of unit radiation detectors arranged closely so as not to form a dead space on the radiation image receiving plane, thereby enabling an obtained picture to precisely represent a radiation image projected on the radiation image receiving plane.

Another object of the present invention is to provide such an apparatus, in which the electronic circuits for processing the signals outputted from the unit radiation detectors are put together in integrated circuits.

A further object of the present invention is to constitute such an apparatus with the integrated electronic circuits combined with the unit radiation detectors.

A still further object of the present invention is to constitute such an apparatus with the integrated electronic circuits separated from the unit radiation detectors.

BRIEF DESCRIPTION OF THE DRAWINGS

The present invention is described in detail in the following on reference to the accompanying drawings, in which:

FIG. 6 shows the signal input opening of the IC packages employed in the embodiment shown in FIG. 5; and FIG. 7 shows the image signal transmitting means in the embodiment shown in FIG. 5.

DETAILED DESCRIPTION OF THE INVENTION

The details of the present invention are described in accordance with some embodiments of an X-ray image detecting apparatus which represents the radiation image detecting apparatus based on the present invention.

Figure 3:
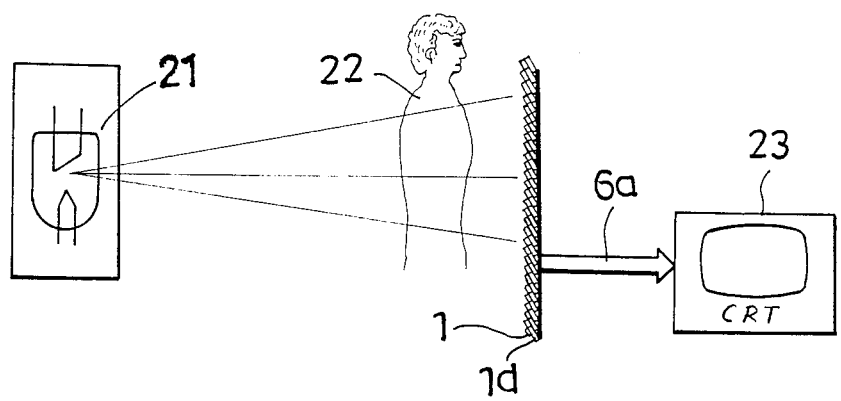
FIG. 3 shows a constitution of an X-ray image detecting apparatus representing the present invention.

Referring to FIG. 3, which schematically shows a constitution of such an X-ray image detecting apparatus, X-rays radiated from an X-ray source 21 penetrate an objective 22 (represented by a human body) and form an X-ray image of the objective 22 on an X-ray image receiving plane consisting of a two-dimensional array of unit X-ray detectors 1 (which constitute the picture elements of the image receiving plane). The X-ray image is converted to electric signals by the unit X-ray detectors 1 and then processed to a picture signal by signal processing circuits accompanying the detectors 1, the circuits being integrated in IC packages 1d, on which the unit detectors 1 are mounted, as is described later. The picture signal, being transferred to a CRT 23, makes it display thereon a picture representing the X-ray image projected on the image receiving plane. The detailed constitution of the X-ray image receiving plane is described in the following, together with the signal processing circuits.

Figure 1A:
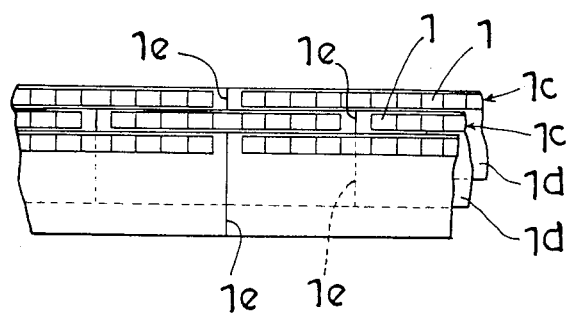
FIG. 1(A) shows a partial front view of the X-ray image receiving plane employed in an embodiment of the present invention.
Figure 1B:
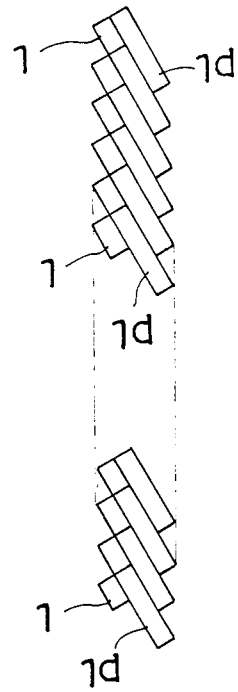
FIG. 1(B) shows a side view of the above X-ray image receiving plane.
Figure 2:
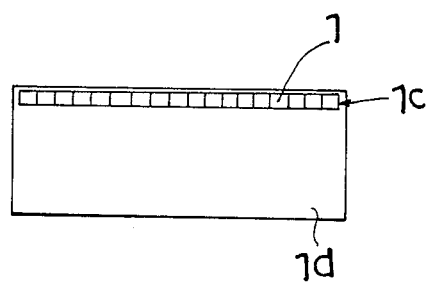
FIG. 2 shows one of the detectors-circuits units constituting the above X-ray image detecting plane.
Figure 4:
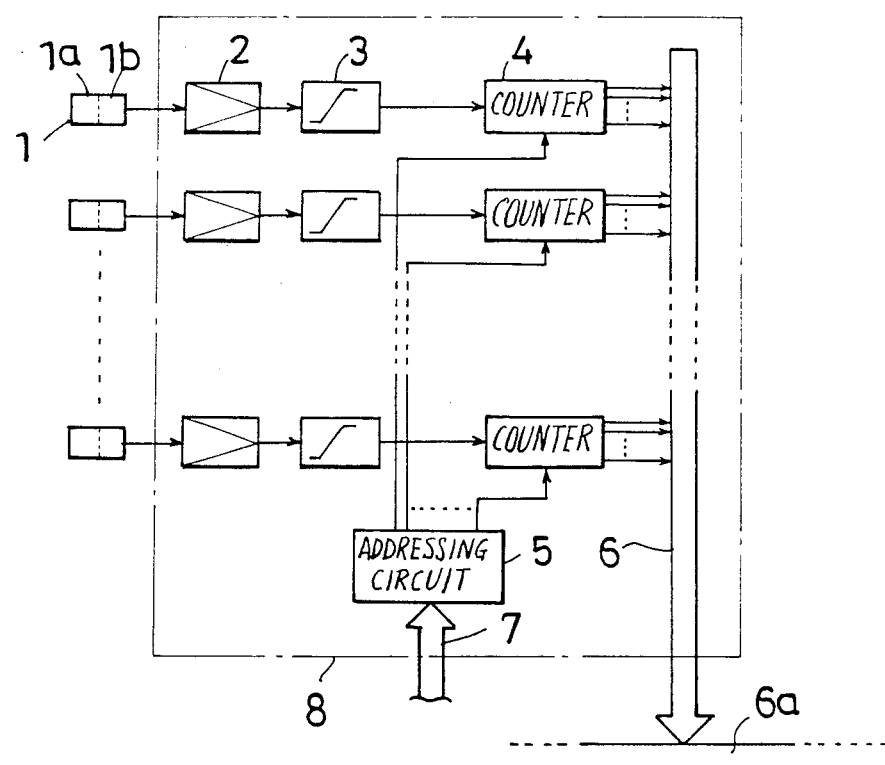
FIG. 4 shows the image signal processing circuits employed in the above embodiment.

Referring to FIG. 2, a one-dimensional array 1c of about 30 unit X-ray detectors 1 (0.32 mm×0.32 mm) are mounted on an IC package 1d (in which such signal processing circuits as is described later on reference to FIG. 4 are integrated corresponding to the above one-dimensionally arrayed detectors 1c), forming a detectors-circuits unit. A plurality of such detectors-circuits units are arranged, as shown in FIGS. 1(A) and 1(B), to partially overlap one another with only the unit detectors 1 exposed, so that the exposed unit detectors 1 may constitute a two-dimensional arrays providing an X-ray image receiving plane having a necessary area, for instance, of 30 cm×30 cm. FIGS. 1(A) and 1(B) show respectively a partial front view and a side view of an arrangement of the detectors-circuits units. As is illustrated in FIG. 1(A), the arrangement is made so that horizontal-directional joints 1e among the detectors-circuits units may be staggered for the purpose of preventing vacant picture elements to be formed vertically in lines along the joints 1e. The staggering of joints 1e causes the picture element vacancies to scatter all over the X-ray image receiving plane, avoiding the formation of linear "dead space" running vertically in parallel thereon. The picture element signals to be obtained from the vacancies are approximately represented by the quantities extrapolated from the signals given by the unit detectors surrounding the vacancies. On the other hand, in each of the IC packages 1d, signal processing circuits 8 as shown in FIG. 4 are integrated corresponding to the X-ray detectors 1 mounted on the surface of the package 1d. The signal processing circuits 8 and unit X-ray detectors 1 constitute one detectors-circuits unit. In FIG. 4 reference signs 1a and 1b means that each of the unit X-ray detectors 1 may be constituted with a combination of an X-ray scintillator 1a and a photosensor 1b coupled to the scintillator 1a, instead of a single element for converting X-rays directly to electric signals. A picture element image signal outputted from each of the unit detectors 1 is amplified by an amplifier 2 and then transferred through a pulse height limitter 3 to a counter 4, which is made up of a series of triggered flip-flop circuits. The counter 4 provisionally stores the detected picture element image signal in the form of a binary-digital signal and then outputs it to a signal output bus line 6 in accordance with an address signal transmitted from an addressing circuit 5, which is operated by address designating signals supplied thereto externally through an address designating data bus line 7. All the picture element signals thus sent out to the signal output bus line 6 from all of the counters 4 are assembled on a main output bus line 6a with respect to all of the detectors-circuits units and supplied to a CRT 23 (FIG. 3) to make the same display a complete picture of an X-ray image projected on the image receiving plane (consisting of a two-dimensional array of unit X-ray detectors 1).

Figure 5:
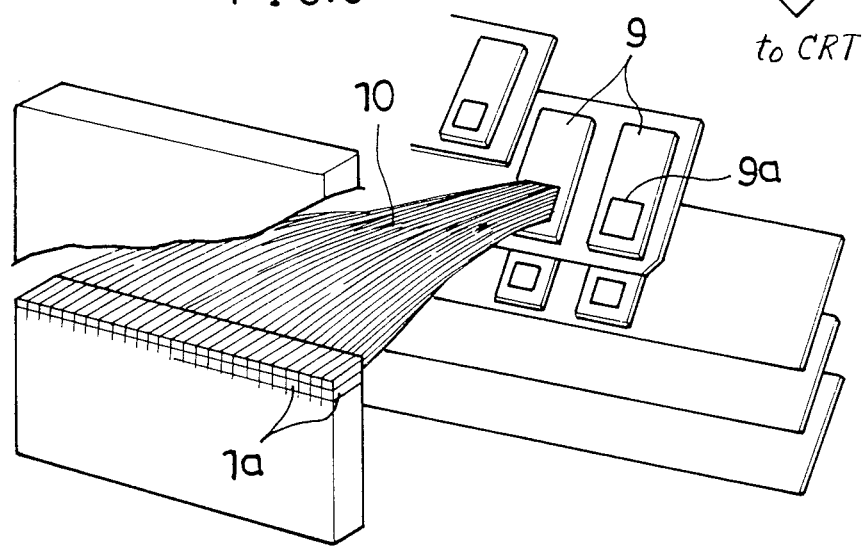
FIG. 5 shows a perspective view of the entire constitution of another embodiment of the present invention.

In another embodiment the X-ray image receiving plane is separated, as is illustrated in FIG. 5, from the signal processing circuits integrated in IC packages 9. In this embodiment the image receiving plane consists of a two-dimensional array of closely arranged single X-ray scintillators 1a, while each of the IC packages 9 contains the same signal processing circuits as those 8 shown in FIG. 4 except that the photosensors 1b are included, as signal (optical) input elements, in the circuits. The photosensors 1b are exposed through an opening 9a provided on the IC package 9. FIG. 6 shows an arrangement of the photosensors 1b in the opening 9a. The number of the signal processing circuits 8 in one IC package is equal to the number of X-ray scintillators contained in one row in the two-dimensional array of X-ray scintillators 1a constituting the X-ray image receiving plane. The optical signals outputted from the scintillators 1a are transmitted to the photosensors 1b by means of optical fibers 10. The louver shape forming arrangement of the IC packages 9 is to spare the space occupied by them. The details of the signal transmission from the scintillators 1a to the photosensors 1b is illustrated in FIG. 7 with one X-ray scintillator exemplified. Referring to FIG. 7 the scintillator 1a has its one end machined to form a convex lens 1f, which concentrates a scintillator output light onto the signal input end of an optical fiber 10. The signal output end of the optical fiber 10 is coupled to one photosensor 1b at one input stage of the signal processing circuits 8a, the details of which are omitted in FIG. 7 since they are, as is previously mentioned, similar to the circuit 8 shown in FIG. 4. This embodiment can be further modified by replacing each of the X-ray scintillators 1a either with an element for converting X-rays directly to electric signal or with a combination of an X-ray scintillator and a photosensor. In these cases the optical fibers 10 must of course be replaced with electroconductive wires, and the picture element signals are inputted directly to the amplifiers 2 in the signal processing circuits 8a shown in FIG. 7 with the photosensors 1b removed.

Further, it is obvious that the present invention, though described with X-ray image detecting apparatus exemplified, can be applied to any type of radiation image detecting system including a γ-ray image detecting apparatus.

We claim:

1. A radiation image detecting apparatus comprising:

a radiation image receiving plane made up of a two-dimensional array of unit radiation detectors; and signal processing electronic circuits having one-to-one correspondence to said unit radiation detectors and processing the signal outputted from said unit radiation detectors, said signal processing electronic circuits being divided into a plurality of circuit groups and integrated within a plurality of flat IC packages separately, said flat IC packages being stacked stepwise with at least their respective upper or lower marginal portions exposed to provide there signal input spaces through which the output signals from said unit radiation detectors are inputted to said signal processing electronic circuits integrated with said IC packages.

2. An apparatus as defined in claim 1, wherein each of said IC packages is provided with at least one series of one-dimensionally arrayed unit radiation detectors at said signal input space, such that the output signals from said unit radiation detectors are enabled to be inputted substantially directly to the input stages of the corresponding signal processing electronic circuits integrated within each of said IC packages, and wherein said IC packages are stacked closely stepwise so that all the unit radiation detectors provided thereon may form a two-dimensional array of unit radiation detectors.

3. An apparatus as defined in claim 2, wherein each of said unit radiation detectors consists of a single detector which converts input radiation directly to an electric signal.

4. An apparatus as defined in claim 2, wherein each of said unit radiation detectors consists of a combination of a scintillator with a photosensor.

5. An apparatus as defined in claim 1, wherein the output signals from said unit radiation detectors are transmitted with signal transmission lines to said signal processing electronic circuits through signal input means prepared at said signal input spaces provided on said IC packages.

6. An apparatus as defined in claim 5, wherein each of said unit radiation sensors is a scintillator, and wherein said signal transmission lines are made of optical fibers and said signal input means are photosensors.

7. An apparatus as defined in claim 5 wherein each of said unit radiation sensors consists of a single detector which converts input radiation directly to an electric input, and wherein said signal transmitting lines are made of electrically conducting wires.

8. An apparatus as defined in claim 5, wherein each of said unit radiation sensors consists of a combination of a scintillator with a photosensor, and wherein said signal transmission lines are made of electrically conducting wires.

9. An apparatus as defined in claim 5, 6, 7 or 8, wherein said IC packages are stacked stepwise with a clearance left between any two adjacent IC packages.

10. An apparatus as defined in claims 3 or 7, wherein said apparatus is made as an X-ray image detecting apparatus by constituting each of said unit radiation detectors and said single detector with an X-ray detector.

11. An apparatus as defined in claims 4, 6, or 8, wherein said apparatus is made as an X-ray image detecting apparatus by constituting each of said unit radiation detectors and said scintillator with an X-ray scintillator.

12. An apparatus as defined in claims 1, 2, or 5, wherein said apparatus is made as an X-ray image detecting apparatus by constituting each of said unit radiation detectors with an X-ray detector.

13. An apparatus as defined in claim 9, wherein said apparatus is made as an X-ray image detecting apparatus by constituting each of said unit radiation detectors with an X-ray detector.

* * * * *